United States Patent [19]

Truesdale et al.

[11] Patent Number: 4,924,034
[45] Date of Patent: May 8, 1990

[54] RE-ENTERABLE ENCLOSURE AROUND SPLICE

[75] Inventors: Grant Truesdale, Cary, N.C.; Tommy Petersen, Ishoej, Denmark

[73] Assignee: Raychem Corporation, Menlo Park, Calif.

[21] Appl. No.: 253,463

[22] Filed: Oct. 5, 1988

Related U.S. Application Data

[63] Continuation of Ser. No. 106,751, Oct. 6, 1987, abandoned.

[51] Int. Cl.$^5$ ............................................. H02G 15/06
[52] U.S. Cl. ................................... 174/87; 174/74 A; 174/DIG. 8
[58] Field of Search .......... 174/74 A, 87, 91, DIG. 8; 206/602, 621, 623, 627; 428/36

[56] References Cited

U.S. PATENT DOCUMENTS

| 2,080,829 | 5/1937 | Meyer et al. | 174/91 |
|---|---|---|---|
| 3,079,459 | 2/1963 | Abbott | 174/91 |
| 3,343,746 | 9/1967 | Shiffman | 206/627 X |
| 3,614,295 | 10/1971 | Gillemot | 174/76 X |
| 3,720,341 | 3/1973 | Greenfield et al. | 206/621 X |
| 3,848,074 | 11/1974 | Channell | 174/87 X |
| 4,194,082 | 3/1980 | Campbell | 174/DIG. 8 X |
| 4,377,237 | 3/1983 | Pawlowski | 206/623 X |
| 4,399,602 | 8/1983 | Hancock et al. | 174/10 X |
| 4,467,137 | 8/1984 | Paget et al. | 174/DIG. 8 X |
| 4,468,536 | 8/1984 | Van Noten | 174/21 R X |
| 4,737,600 | 4/1988 | Mathis et al. | 174/87 |

FOREIGN PATENT DOCUMENTS 13004 of 0000 United Kingdom ............... 206/616
1448475 9/1976 United Kingdom .

Primary Examiner—Morris H. Nimmo
Attorney, Agent, or Firm—A. Stephen Zavell; Herbert G. Burkard

[57] ABSTRACT

A butt cable splice is environmentally sealed by a closure that may be integrally blow-moulded, but which can be cut for re-entry and then resealed by partially telescoping together the resulting parts.

11 Claims, 2 Drawing Sheets

RE-ENTERABLE ENCLOSURE AROUND SPLICE

The present application is a continuing application of Ser. No. 106,751, filed Oct. 6, 1987, now abandoned.

The present invention relates to a re-enterable enclosure, particularly one for forming an environmental seal around an elongate substrate such as a cable splice.

It is often necessary to protect substrates such as cable splices from the environment, particularly from water or water vapour and many suggestions have been made, particularly in the cables accessories art, as to how this should be done. Whilst the most common cable splice enclosure is designed for cables spliced coaxially, end-to-end, it is sometimes desirable to join two cables in what is known as a butt configuration In a butt configuration two (or more) cables are aligned with their ends side-by-side and facing the same direction. An enclosure, generally cylindrical with one blind end, is then placed over the side-by-side, spliced, cables. The opening in the enclosure through which the cables pass may be sealed to the cables to prevent water or other contaminant entering the enclosure and damaging the spliced conductors. Such a seal may be made by heat-shrinking the end of the enclosure into engagement, with the cables, optionally with the help of a branch-off clip as disclosed and claimed in GB No. 1604981 (Raychem). This type of closure is marketed under the Raychem trade mark "Pedcap" and may be described as a cable end cap (British Telecom for example calls it a kit joint closure cap ended). A variation on this type of enclosure is a radial distribution enclosure where a splice between a looped cable and drop wires is sealed. A radial distribution enclosure has a base having separate outlets for the drop wires in addition to an outlet for the looped cable. For the purpose of this specification, however, a radial distribution closure is regarded as a type of end cap. Reference may be made to U.S. Pat. No. 4,194,052 (Campbell) and to U.S. Pat. No. 4,467,137 (Paget).

A problem may arise with such enclosures when it is desired to regain access to the splice for repair or alteration to the connections and then to reseal the enclosure. This operation is known as re-entry, or as re-entry and resealing. It is preferable not to disturb the seal to the cables since it may be difficult to remake and there may be danger of damaging the cable jackets. Hence complete removal of the old enclosure is best avoided. If the endcap is cut in order to remove part of it to expose the splice, the two parts will not be easily rejoined.

We have now discovered that a cable splice enclosure can be so shaped that it can be supplied in one piece but can later be cut for reentry such that one part can slide within another part (an operation which is known in itself in other art see GB No. 1448475), and that a reliable new seal can be formed.

Thus the invention provides an environmentally-sealed cable splice which comprises
 (a) a butt cable splice between at least two substantially side-by-side cables; and
 (b) a re-enterable enclosure heat-shrunk around the cable splice, the enclosure comprising
  (i) a first substantially tubular part through which said cables extend and an outlet, said outlet being heat-shrunk around the cables, and
  (ii) a second part which is hollow and which together with the first part forms a closed space within which lies the cable splice, the second part being attached to the first part but separable therefrom by cutting the closure;
the first part or second part having a portion that has inside diameter that is substantially equal to the outside diameter of a portion of respectively the second part or first part such that after said cutting the portion of one of the first and second parts can be slid within the portion of the other of the first and second parts to reconstitute the closure.

We prefer that the first and second parts slide together with a substantially sealing fit. We also prefer that the two parts can be at least partially separated (preferably totally separated) by a single cut line. The portions referred to of the first part and of the second part preferably lie immediately adjacent one another. Before cutting, they are therefore preferably adjacent parts of the same integral structure. Alternatively, after cutting, the two parts could be assembled in a different configuration, although this is not preferred at present.

In general the portion of the first part (the first portion) will have a smaller diameter than the portion of the second part (the second portion), the difference being substantially equal to the wall thickness of the second portion, although the tolerances are not critical. Before cutting they may be joined together by a web of material that is preferably removed during the cutting step.

In order that such a web be removed in a single cutting step, cutting may be carried out by a saw (for example a flexible wire saw) of suitable thickness. Alternatively, the web may remain but be flexible enough for it to be deformed out of the path of the first portion as it is slid into place. A further possibility is for it to be cut away by cutting along a second cut line close to the first.

The enclosure preferably has guide means and/or a line of weakness for facilitating making of the cut. Such means or line may comprise a recess in the wall of the enclosure.

The overall size and shape of the enclosure will of course depend on the size and shape of the substrate it has to protect. In general, for protection of cable splices we prefer that the enclosure is substantially cylindrical having one substantially dome-shaped blind end. The diameter of the enclosure is preferably from 30–200 mm and its length is preferably from 200–700 mm. Its open end (at least) is preferably heat shrinkable in order that it can be supplied at larger diameter in order that a bulky cable splice can pass through it and that it can be recovered into engagement with the cables themselves once the enclosure is properly in position over the splice. A recovery ratio of from 2:1 to 4:1 (change in dimension based on new dimension) is preferred. Where a high recovery ratio is desired and where there is perceived to be a risk of the material splitting on recovery, the extreme end of the enclosure may be flared in its pre-expanded or recovered state. In this way its extreme end will have a smaller recovery ratio and splitting can be avoided.

The enclosure may be manufactured in any suitable way but we prefer that it be by moulding, especially blow-moulding, particularly one-piece blow-moulding.

The invention is further illustrated by the following drawings, in which.

Figure 1:
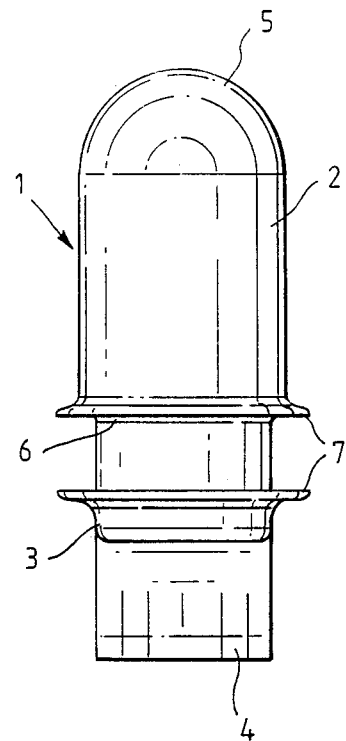
FIG. 1 shows an enclosure as supplied.

FIG. 1 shows an enclosure I of the invention nominally at least comprising two parts 2 and 3. One end 4 is open and may be heat-shrinkable and the other end 5 is blind. A line of weakness or means for guiding a saw or knife is shown at 6. The enclosure 1 is therefore cut into two parts at line 6. The precise shape of the enclosure in the region of line 6 will depend on the manufacturing technique. Flanges 7 are provided for holding the two parts together after reentry by cutting, and resealing.

Figure 2:
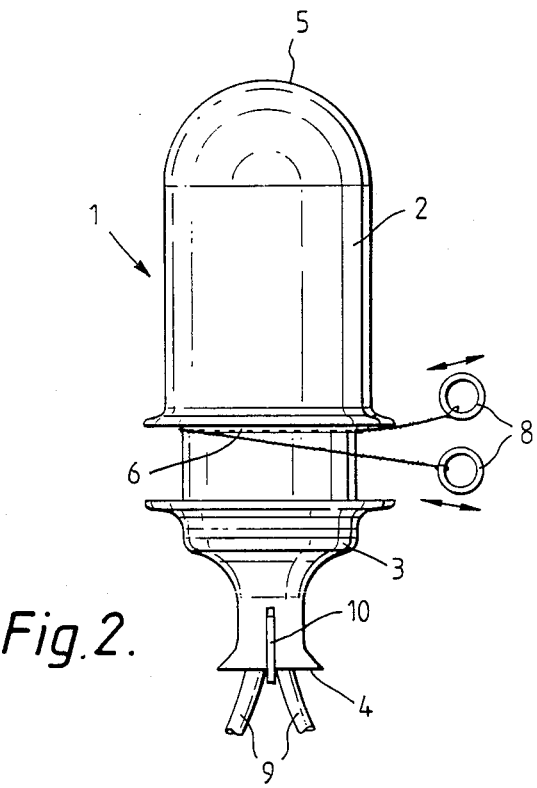
FIG. 2 shows an installed enclosure being cut for reentry.

FIG. 2 shows the enclosure installed around a splice (hidden inside) between two cables 9. A saw 8 is being used to cut the enclosure for reentry. A branch-off clip 10 is shown positioned over the open end 4 to form two conduits, one for each cable 9.

Figure 3:
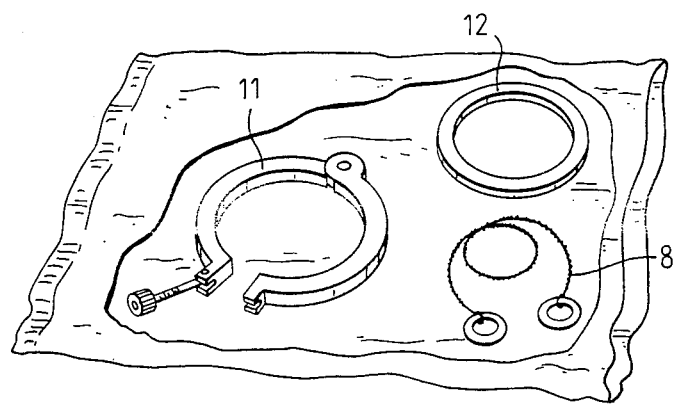
FIG. 3 shows a kit-of-parts useful for carrying out re-entry and resealing.

FIG. 3 shows a kit that may be supplied for reentry and resealing. It may contain a saw 8, a clamp 11 which holds the two flanges 7 together after the part 3 has been slid inside part 2, and a sealing washer 12 that may help form a seal between the flanges 7. A reinforcing band may be provided for positioning inside the part 3 against which the clamp 11 can (indirectly) bear.

Figure 4A:
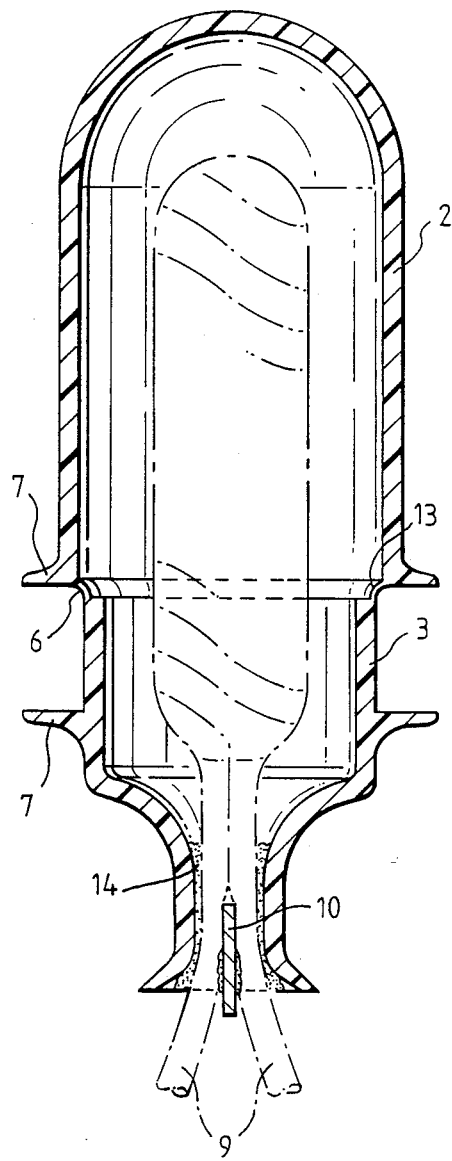
FIGS. 4a and 4b show cross-sections of the enclosure before and after cutting.
Figure 4B:
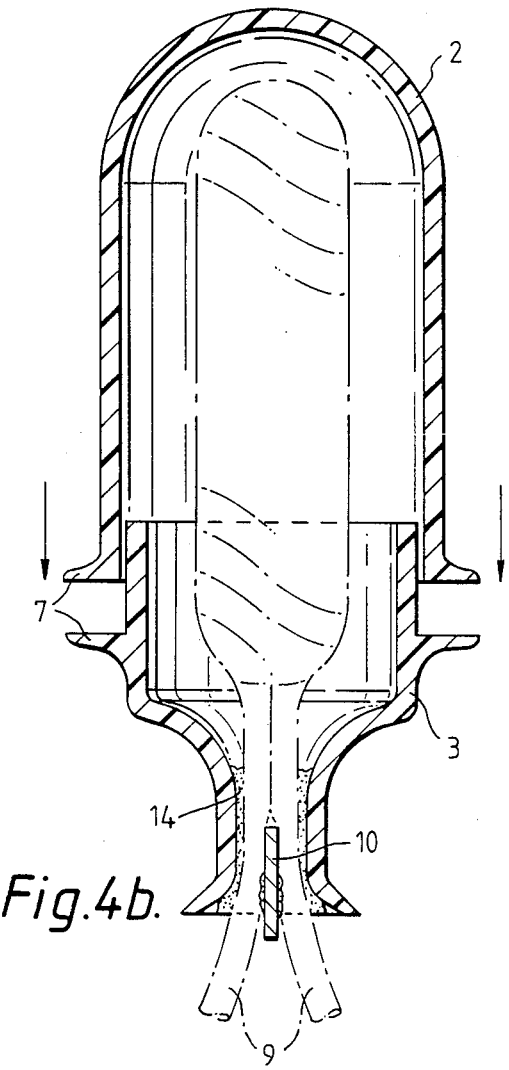

FIGS. 4a and 4b show the two parts 2 and 3 before and after cutting and sliding of one within the other. A web of material 13 can be seen, which conveniently is removed by cutting using a saw. An adhesive 14 is shown around the cables 9 at the outlet, enhancing the seal provided by the enclosure.

We claim:

1. An environmentally-sealed cable splice which comprises:
   (a) a butt cable splice between at least two substantially side-by-side cables; and
   (b) a re-enterable enclosure heat-shrunk around the cable splice, the enclosure comprising
      (i) a first substantially tubular part through which said cables extend and an outlet, said outlet being heat-shrunk around the cables, and
      (ii) a second part which is hollow and which together with the first part forms a closed space within which lies the cable splice, the second part being attached to the first part but separable therefrom by cutting the closure;

the first part or second part having a portion that has an inside diameter that is substantially equal to the outside diameter of a portion of respectively the second part or first part such that after said cutting the portion of one of the first and second parts can be slid within the portion of the other of the first and second parts to reconstitute the closure.

2. A sealed splice according to claim 1, in which the portion of one of the first and second parts is a substantially sealing fit within the portion of the other of the first and second parts.

3. A sealed splice according to claim 1, in which the first and second parts can be separated by a single cut line.

4. A sealed splice according to claim 1, in which the enclosure has guide means to facilitate making the cut.

5. A sealed splice according to claim 1, in which the enclosure has a line of weakness to facilitate making the cut.

6. A sealed splice according to claim 1, in which each of the first and second parts has a flange, which flanges abut one another when one of the first and second parts is slid within the other of the first and second parts.

7. A sealed splice according to claim 1, in which the second part has a substantially dome-shaped closed end.

8. A sealed splice according to claim 1, in which the enclosure is formed by blow-moulding.

9. A sealed splice according to claim 8 in which the first and second parts are formed integrally with one another.

10. A sealed splice according to claim 1 in which the first and second parts are formed integrally with one another.

11. A sealed splice according to claim 1, in which a branch-off seal between the cables and the outlet is formed with a branch-off clip between the cables and having legs of the clip extending outside the outlet.

* * * * *